US012809104B2

(12) United States Patent
Kumar et al.

(10) Patent No.: US 12,809,104 B2
(45) Date of Patent: Nov. 24, 2026

(54) OPTICAL FIBER RIBBON WITH A PASSIVE LAYER

(71) Applicant: Sterlite Technologies Limited, Gurugram (IN)

(72) Inventors: Sravan Kumar, Gurugram (IN); Kishore Sahoo, Gurugram (IN); Raj Gangwar, Gurugram (IN)

( * ) Notice: Subject to any disclaimer, the term of this patent is extended or adjusted under 35 U.S.C. 154(b) by 414 days.

(21) Appl. No.: 18/340,846

(22) Filed: Jun. 24, 2023

(65) Prior Publication Data

US 2024/0176087 A1 May 30, 2024

(51) Int. Cl.
*G02B 6/44* (2006.01)

(52) U.S. Cl.
CPC .................................. *G02B 6/4432* (2013.01)

(58) Field of Classification Search
CPC .............................. G02B 6/4403; G02B 6/448
See application file for complete search history.

(56) References Cited

U.S. PATENT DOCUMENTS 4,660,927 A * 4/1987 Kondow ............... C03C 25/106 65/432
5,181,268 A * 1/1993 Chien .................. G02B 6/4402 174/76
6,321,014 B1 * 11/2001 Overton ............... G02B 6/4482 385/128
6,714,713 B2 * 3/2004 Lanier .................. G02B 6/4486 385/127
2007/0031096 A1 * 2/2007 Moorjani ............. G02B 6/4431 385/128
2008/0085947 A1 * 4/2008 Ward ...................... C03C 25/26 522/42
2019/0049681 A1 * 2/2019 Bookbinder ....... G02B 6/02395
2020/0400903 A1 * 12/2020 Tanaka ................... G02B 6/448
2021/0231896 A1 * 7/2021 Bickham ............ G02B 6/02395

OTHER PUBLICATIONS

European search opinion on the counterpart EP application 23181402. (Year: 2024).*

* cited by examiner

*Primary Examiner* — Charlie Y Peng
(74) *Attorney, Agent, or Firm* — Steven R. Fairchild

(57) ABSTRACT

The present invention relates to an optical fiber ribbon (100) having a plurality of optical fibers (102) arranged substantially parallel to one another and a plurality of resin joints (116) applied intermittently for contacting the color layer (114) of each pair of adjacent optical fibers to form bonded portions of the optical fiber ribbon (100). In particular, each optical fiber of the plurality of optical fibers (102) further comprises one or more coatings (108), a passive layer (112) surrounding the one or more coatings (108), a color layer (114) surrounding the passive layer (112).

13 Claims, 3 Drawing Sheets

OPTICAL FIBER RIBBON WITH A PASSIVE LAYER

CROSS-REFERENCE TO RELATED APPLICATIONS

This application claims the benefit of Indian Application No. 202211067689 titled "OPTICAL FIBER CABLE WITH ACCESSIBLE STRENGTH MEMBER" filed by the applicant on Nov. 24, 2022, which is incorporated herein by reference in its entirety.

FIELD OF THE INVENTION

Embodiments of the present invention relate to optical communication or fiber ribbons of the optical fiber cables and more particularly, relate to an optical fiber ribbon with a passive layer.

DESCRIPTION OF THE RELATED ART

Fiber to the premises/business/home (i.e., FTTx) provides broadband data transfer technology to the individual end-user. FTTx installations, which are being increasingly deployed throughout the world, are making use of innovative, reduced-cost system designs to promote the spread of the technology. For example, fiber be delivered in the last link by way of a micro-cable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Optical fibers have seen increased use in a wide variety of electronics and telecommunications fields. Optical fiber ribbons hold multiple optical fibers together in a group or array. The optical fiber ribbon includes a body formed from a material that holds the optical fibers together and/or that provides structure that assists in the handling and connecting of the optical fibers of the ribbon to various components or devices.

Generally, an optical fiber has a glass core, a cladding, a primary coating, and then a secondary coating. Further, a color layer is generally disposed over the secondary coating and an Intermittently Bonded Ribbon [IBR] is made by bonding adjacent optical fibers intermittently using Ultraviolet (UV) curable resin applied on the color coating.

Prior art reference US2022155540A1 discloses about a sacrificial layer above a secondary coating of an optical fiber and above further the sacrificial layer disposed above the color layer. The ribbon bonds are present on the sacrificial layer. The reference Another prior art reference IN202014049225A discloses a sacrificial layer above the secondary coating and that the ink can be added to the sacrificial layer.

The prior art references mentioned above have disadvantages such as when an optical fiber is stripped from an IBR, the secondary coating gets damaged, which is not desirable. Further, scrap generation is high due to splitting during bunching if bond strength is kept low and high bond strength can cause more damage to the secondary coating during stripping. As per industry generic requirements and characteristics of single-mode and multimode optical fibers, optical fiber ribbons, and optical fiber cables, there should not be any damage to fiber coatings (i.e., the primary and secondary coatings) during stripping.

Therefore, in the light of the above-stated discussion, there is a need to provide a technical solution that overcomes the aforementioned problems by providing an optical fiber ribbon (i.e., an IBR) such that each optical fiber has a passive layer and is manufactured in a way such that there is no damage to coatings (e.g., primary and secondary coatings) of an optical fiber when the optical fiber is stripped from the optical fiber ribbon. Thus, the present invention provides an optical fiber ribbon with a passive layer.

SUMMARY OF THE INVENTION

Embodiments of the present invention relate to an optical fiber ribbon comprising a plurality of optical fibers arranged substantially parallel to one another and a plurality of resin joints configured to intermittently contact the color layer of each pair of adjacent optical fibers of the plurality of optical fibers to form bonded portions of the optical fiber ribbon. Each optical fiber of the plurality of optical fibers further comprises one or more coatings, passive layer surrounding the one or more coatings, a color layer surrounding the passive layer.

In accordance with an embodiment of the present invention, each optical fiber of the plurality of optical fibers further comprising a core, a cladding, the one or more coatings that surrounds the cladding. In particular, the cladding is configured to surround the core and the one or more coatings is configured to surround the cladding.

In accordance with an embodiment of the present invention, the one or more coatings comprises at least one of, (i) a combination of an inner coating (108*aa*) and an outer coating and (ii) the outer coating.

In accordance with an embodiment of the present invention, the passive layer is made up of an Ultraviolet (UV) curable acrylate polymer. In particular, the passive layer is cured at least 85%. Moreover, the thickness of the passive layer is in the range of 4 micrometers (μm) to 12 μm. Further, the passive layer has an elongation at break of at least 20%. Furthermore, the passive layer has a tensile strength in a range of 2 Megapascal to 40 MPa. And, the passive layer has a viscosity in a range of 0.2 Pascal-Second (Pa·s) to 4.2 Pa·s at 30 degree Celsius (° C.).

In accordance with an embodiment of the present invention, the passive layer and the color layer are applied in a tandem process.

In accordance with an embodiment of the present invention, the passive layer and the color layer has a first strip force therebetween in a range of 3 Newton (N) to 9N. And, the passive layer and the second coating has a second strip force therebetween in a range of 1 N to 5 N.

In accordance with an embodiment of the present invention, the color layer concentrically surrounds an outer circumferential surface of the passive layer.

The foregoing objectives of the present invention are attained by employing a method of manufacturing a strength member for optical fiber cables.

BRIEF DESCRIPTION OF THE DRAWINGS

So that the manner in which the above-recited features of the present invention is understood in detail, a more particular description of the invention, briefly summarized above, be had by reference to embodiments, some of which are illustrated in the appended drawings. It is to be noted, however, that the appended drawings illustrate only typical embodiments of this invention and are therefore not to be considered limiting of its scope, for the invention admit to other equally effective embodiments.

The invention herein will be better understood from the following description with reference to the drawings, in which.

The optical fiber ribbon is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

Figure 1A:
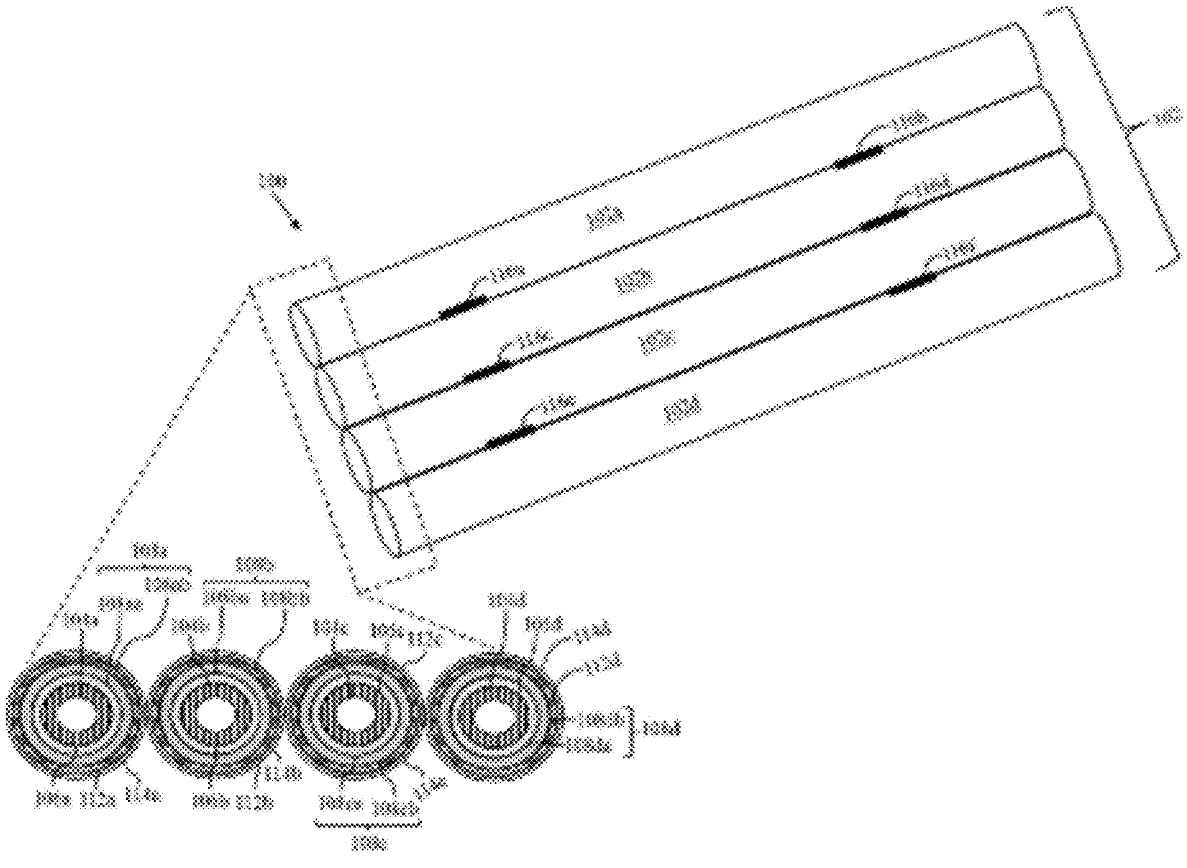
FIG. 1A is a pictorial snapshot illustrating a perspective view of an optical fiber ribbon in accordance with an embodiment of the present invention.
Figure 1B:
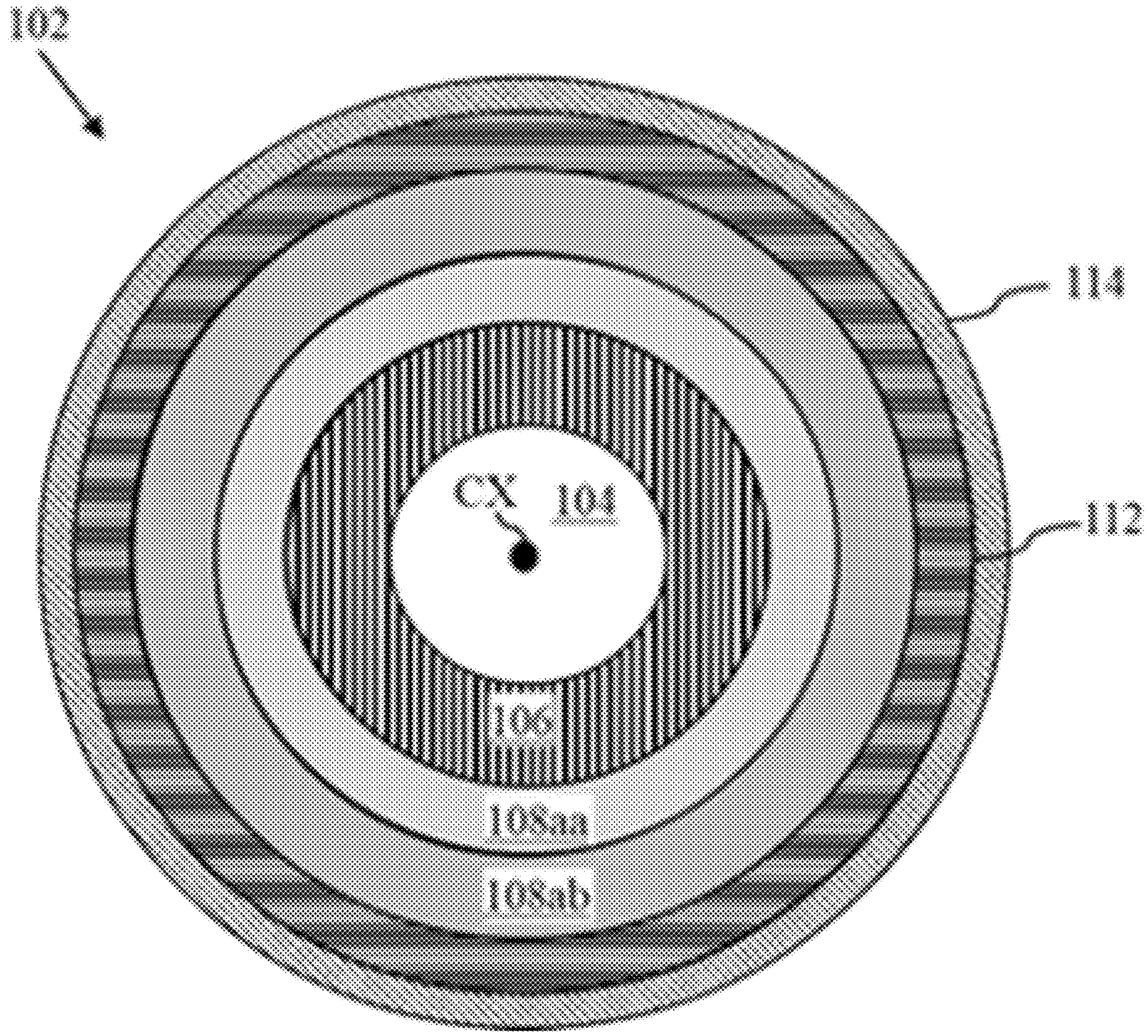
FIG. 1B is a pictorial snapshot illustrating a a cross-sectional view of an optical fiber of the optical fiber ribbon in accordance with another embodiment of the present invention.

The principles of the present invention and their advantages are best understood by referring to FIG. 1A to FIG. 1B. In the following detailed description, numerous specific details are set forth in order to provide a thorough understanding of the embodiment of the invention as illustrative or exemplary embodiments of the invention, specific embodiments in which the invention be practiced are described in sufficient detail to enable those skilled in the art to practice the disclosed embodiments. However, it will be obvious to a person skilled in the art that the embodiments of the invention be practiced with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The Following Brief Definition of Terms Shall Apply Throughout the Present Invention:

Optical fiber refers to a medium associated with the transmission of information over long distances in the form of light pulses. The optical fiber uses light to transmit voice and data communications over long distances when encapsulated in a jacket/sheath. The optical fiber be of ITU.T G.657.A2 category. Alternatively, the optical fiber be of ITU.T G.657.A1 or G.657.B3 or G.652.D or other suitable categories. The ITU.T stands for International Telecommunication Union-Telecommunication Standardization Sector, is one of the three sectors of the ITU. The ITU is the United Nations specialized agency in the field of telecommunications and is responsible for studying technical, operating and tariff questions and issuing Recommendations on them with a view to standardizing telecommunications on a worldwide basis.

The term "core" of an optical fiber as used herein is referred to as the innermost cylindrical structure present in the center of the optical fiber, that is configured to guide the light rays inside the optical fiber.

The term "cladding" of an optical fiber as used herein is referred to as one or more layered structure covering the core of an optical fiber from the outside, that is configured to possess a lower refractive index than the refractive index of the core to facilitate total internal reflection of light rays inside the optical fiber. Further, the cladding of the optical fiber include an inner cladding layer coupled to the outer surface of the core of the optical fiber and an outer cladding layer coupled to the inner cladding from the outside.

The term "refractive index" as used herein is referred to as the measure of change of speed of light from one medium to another and is particularly measured in reference to speed of light in vacuum. More specifically, the refractive index facilitates measurement of bending of light from one medium to another medium.

The term one or more coatings 108*a* is interchangeably referred to and designated as "the first one or more coatings 108*a*" for convenience throughout the specification.

The term second set of one or more coatings 108*b* is interchangeably referred to and designated as the second one or more coatings 108*b*" for convenience throughout the specification.

The term third set of one or more coatings 108*c* is interchangeably referred to and designated as "the third one or more coatings 108*c*" for convenience throughout the specification.

The term the first optical fiber 102*a* is interchangeably referred to and designated as "the optical fiber 102" for convenience throughout the specification.

The term first core 104*a* is interchangeably referred to and designated as "the core 104" for convenience throughout the specification.

The term first cladding 106*a* is interchangeably referred to and designated as "the cladding 106 for convenience throughout the specification.

The term first one or more coatings 108*a* is interchangeably referred to and designated as "the one or more coatings 108" for convenience throughout the specification.

The term first inner coating 108*aa* is interchangeably referred to and designated as "the inner coating 108*aa*" for convenience throughout the specification.

The term first outer coating 108*ab* is interchangeably referred to and designated as "the outer coating 108*ab*" for convenience throughout the specification.

The term first passive layer 112*a* is interchangeably referred to and designated as "the passive layer 112" for convenience throughout the specification.

The term first color layer 114*a* is interchangeably referred to and designated as "the color layer 114" for convenience throughout the specification.

The term "curing" as used herein, refers to a chemical process that produces a toughening and/or hardening of a polymer material by cross-linking of polymer chains.

Figure 1C:
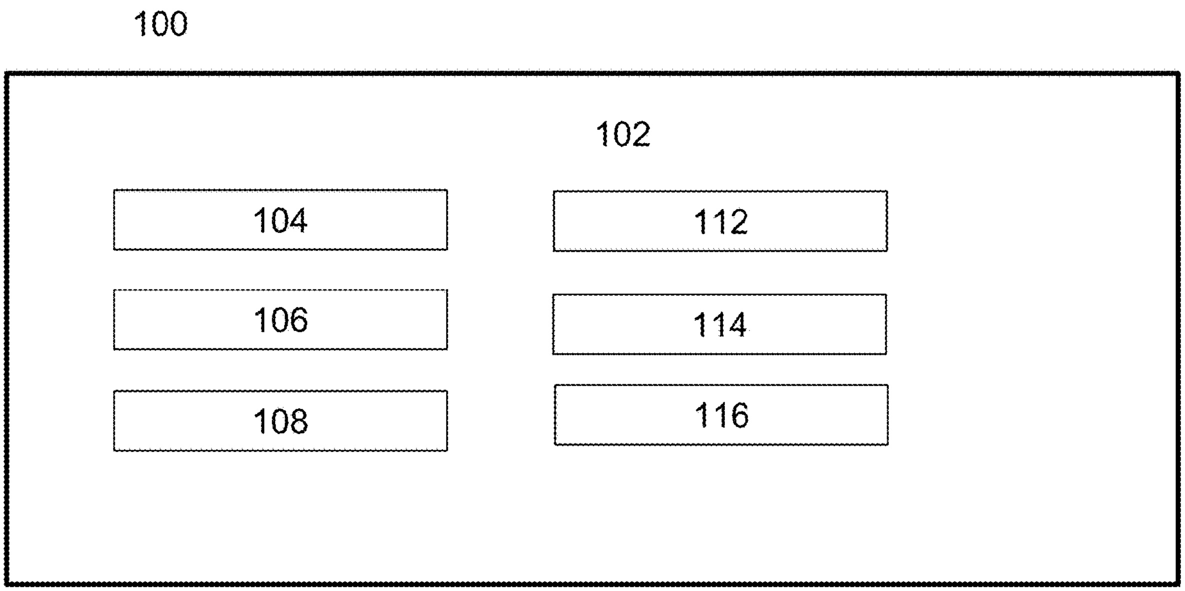
FIG. 1C is a block diagram illustrating components of the optical fiber of the optical fiber ribbon in accordance with an embodiment of the present invention.

FIG. 1A and FIG. 1B are pictorial snapshots illustrating a perspective view of an optical fiber ribbon 100 in accordance with one or more exemplary aspects of the present invention. FIG. 1C is a block diagram illustrating components of the optical fiber of the optical fiber ribbon in accordance with an embodiment of the present invention.

Now simultaneously referring to FIG. 1A-FIG. 1C. The optical fiber ribbon 100 is an easy to implement optical fiber ribbon that is manufactured in a way such that there is no damage to optical fiber's coatings (e.g., primary and secondary coatings). Moreover, the optical fiber ribbon 100 have a plurality of optical fibers 102 arranged substantially in parallel and adjacent to one another to form the optical fiber ribbon 100. Further, the plurality of optical fibers 102 are intermittently bonded to form an intermittently bonded optical fiber.

Each optical fiber of the plurality of optical fibers 102 has a substantially circular cross section. The plurality of optical fibers 102 has first through fourth optical fibers 102*a*-102*d*. In particular, the first through fourth optical fibers 102*a*-102*d* have first through fourth cores 104*a*-104*d*, first through fourth claddings 106*a*-106*d*, first through fourth set of one or more coatings 108, first through fourth passive layers 112*a*-112*d*, and first through fourth color layers 114*a*-114*d*, respectively. Moreover, the first optical fiber 102*a* have the first core 104*a*, the first cladding 106*a*, the first set of one or more coatings 108*a* of which a first inner coating 108*aa* and a first outer coating 108*ab* are shown, the first passive layer 112*a*, and the first color layer 114*a*.

In accordance with an embodiment of the present invention, the second optical fiber 102*b* have the second core 104*b*, the second cladding 106*b*, the second one or more coatings 108*b*" of which a second inner coating 108*ba* and a second outer coating 108*bb* is shown, the second passive layer 112*b*, and the second color layer 114*b*.

Similarly, the third optical fiber 102*c* have the third core 104*c*, the third cladding 106*c*, the third one or more coatings 108*c* of which a third inner coating 108*ca* and a third outer coating 108*cb* is shown, the third passive layer 112*c*, and the third color layer 114*c*.

The fourth optical fiber 102*d* have the fourth core 104*d*, the fourth cladding 106*d*, the fourth set of one or more coatings 108*d* (hereinafter interchangeably referred to and designated as "the fourth one or more coatings 108*d*") of which a fourth inner coating 108*da* and a fourth outer coating 108*db* is shown, the fourth passive layer 112*d*, and the fourth color layer 114*d*.

In accordance with an embodiment of the present invention, the optical fiber ribbon 100 has four optical fibers but it will be apparent to a person skilled in the art that the scope of the present invention is not limited to it. In alternative aspects, the optical fiber ribbon 100 have any number of optical fibers, without deviating from the scope of the present invention.

In accordance with an embodiment of the present invention, first one or more coatings 108*a* has one of, the first outer coating 108*ab* and a combination of the first inner coating 108*aa* and the first outer coating 108*ab*. Alternatively, in one aspect, the first one or more coatings 108*a* have only the first outer coating 108*ab*. In another aspect of the present invention, the first one or more coatings 108*a* have a combination of the first inner coating 108*aa* and the first outer coating 108*ab*.

In accordance with an embodiment of the present invention, the second through fourth one or more coatings 108*b*-108*d* have only the second through fourth outer coatings 108*bb*-108*db*. Alternatively, in another aspect, the second through fourth one or more coatings 108*b*-108*d* have a combination of the second through fourth inner coatings 108*ba*-108*da* and the second through fourth outer coatings 108*bb*-108*db*, respectively, without deviating from the scope of the present invention.

In accordance with an embodiment of the present invention, the optical fiber ribbon 100 further have a plurality of resin joints 116. The first through sixth resin joints 116*a*-116*f* is applied intermittently contacting the color layers (i.e., the first through fourth color layers 114*a*-114*d*) of the adjacent optical fibers of the plurality of optical fibers 102 to form bonded portions of the optical fiber ribbon 100.

In some aspects of the present invention, the first through fourth optical fibers 102*a*-102*d* is bonded in a bonding pattern such as, but not limited to, a parallel pattern, a crisscross pattern, and the like. Aspects of the present invention are intended to include and/or otherwise cover any type of the bonding pattern without deviating from the scope of the present invention.

In particular, the first and second resin joints 116*a* and 116*b* is applied intermittently contacting the first and second color layers 114*a* and 114*b* of the first and second optical fibers 102*a* and 102*b*, respectively. Further, the third and fourth resin joints 116*c* and 116*d* are applied intermittently contacting the second and third color layers 114*b* and 114*c* of the second and third optical fibers 102*b* and 102*c*, respectively. Furthermore, the fifth and sixth resin joints 116*e* and 116*f* are applied intermittently contacting the third and fourth color layers 114*c* and 114*d* of the third and fourth optical fibers 102*c* and 102*d*, respectively.

The optical fiber ribbon 100 has six resin joints but it will be apparent to a person skilled in the art that the scope of the present invention is not limited to it. In various other aspects, the optical fiber ribbon 100 have any number of resin joints, without deviating from the scope of the present invention In accordance with an embodiment of the present invention, the plurality of resin joints are made up of a curable resin material such as but not limited to an Ultraviolet (UV) curable resin material, a polyester resin, a phenolic resin, an alkyd resin, a polycarbonate resin, a polyamide resin, a silicone resin, an epoxy resin, an acrylate polymer, and the like. Aspects of the present invention are intended to include and/or otherwise cover any type of the curable resin, including known, related, and later developed curable resins, without deviating from the scope of the present invention.

In accordance with an embodiment of the present invention, the optical fiber 102 is, but not limited to, a single mode optical fiber, a multimode optical fiber, a single core optical fiber, a multicore optical fiber, and the like. Moreover, the optical fiber 102 have a diameter in a range of 130 micrometers (μm) to 260 μm. Further, the optical fiber 102 have the core 104, the cladding 106, the one or more coatings 108, the passive layer 112, and color layer 114.

In accordance with an embodiment of the present invention, the core 104 is arranged concentric to a central axis CX of the optical fiber 102 such that the core 104 runs longitudinally, (i.e., concentric to the central axis CX). In particular, the core 104 is designed to guide one or more of optical signals. Moreover, the core 104 is a cylindrical structure that run along a length of the optical fiber 102. Further, the core 104 is made up of a material such as, but not limited to, a plastic, a pure silica glass, a doped silica glass, and the like. Aspects of the present invention are intended to include and/or otherwise cover any type of the material for the core 104 including known, related and later developed materials, without deviating from the scope of the present invention.

In accordance with an embodiment of the present invention, the core 104 defines a spatial path to facilitate in carrying the one or more optical signals. In some aspects of the present invention, the core 104 can have a circular cross-sectional shape. It will be apparent to a person skilled in the art that the core 104 is shown to have the circular shape to make the illustrations concise and clear and should not be considered as a limitation of the present invention.

In accordance with an embodiment of the present invention, the optical fiber 102 has the cladding 106 concentrically surrounding an outer circumferential surface of the core 104. In some aspects of the present invention, the cladding 106 is made up of a material such as, but not limited to, a plastic, a pure silica glass, a doped silica glass, and the like. Aspects of the present invention are intended to include and/or otherwise cover any type of the material for the cladding 106 including known, related and later developed materials, without deviating from the scope of the present invention. In some aspects of the present invention, the refractive index of the cladding 106 is manipulated to ensure restriction of the light signal well within the core 104 of the optical fiber 102.

In accordance with an embodiment of the present invention, the optical fiber 102 further has the inner coating **108*aa* and the outer coating 108*ab*. In various other aspects, the optical fiber 102 have any number of inner and outer coatings, without deviating from the scope of the present invention. In particular, the inner and outer coatings 108*aa* and 108*ab* can be made up of an ultraviolet (UV) light curable resin which is formed of, for example, a single material. In another aspect, the inner and outer coatings 108*aa* and 108*ab*** can have the UV light curable acrylate mixture of monomers, oligomers, photo initiators, and additives, such that the mixtures are cured separately.

In accordance with an embodiment of the present invention, the optical fiber 102 has the passive layer 112 concentrically surrounding and in contact with the outer coating **108*ab*. Particularly, the passive layer 112 is disposed on the outer coating 108*ab* such that the passive layer 112 surrounds concentrically, an outer circumferential surface of the outer coating 108*ab* and the passive layer 112 is in contact with the outer coating 108*ab*. Further, the passive layer 112 is provided to protect the outer coating 108*ab* when the optical fiber 102 is stripped from the optical fiber ribbon 100. The passive layer 112 is made up of an Ultraviolet (UV) curable acrylate polymer. The passive layer 112 substantially limit damage to the outer coating 108*ab* and the inner coating 108*aa* when the optical fiber 102 is stripped from the optical fiber ribbon 100**.

In accordance with an embodiment of the present invention, the passive layer 112 is cured at least 85%. The curing of the passive layer 112 is done at least 85% as below 85%, bonding between the passive layer 112 and the color layer 114 is too strong and lead to damage to the outer coating **108*ab* of the optical fiber 102**.

In accordance with an embodiment of the present invention, the passive layer 112 has a thickness that is in a range of 4 μm to 12 μm. Particularly, the thickness of the passive layer 112 is selected to be in the range of 4 μm to 12 μm, as below 4 μm, the coating process of the passive layer 112 is difficult and further at such thickness (i.e., below 4 μm) the passive layer 112 not function properly. Further, in case the thickness of the passive layer 112 is selected above 12 μm, the thickness of the optical fiber 102 will increase which is not desirable. In some aspects of the present invention, the passive layer 112 have an elongation at break of at least 20%.

In accordance with an embodiment of the present invention, the elongation at break of the passive layer 112 is selected to be 20% as below 20%, the passive layer not break easily and can thus damage the outer coating **108*ab* of the optical fiber 102**.

In accordance with an embodiment of the present invention, the passive layer 112 have a tensile strength in a range of 2 Megapascal (MPa) to 40 MPa. Specifically, the tensile strength of the passive layer 112 is selected to be in the range of 2 MPa to 40 MPa, as below 2 MPa, mechanical strength not be enough for handling the optical fiber ribbon 100 and above 40 MPa, the passive layer 112 damage the outer coating **108*ab* of the optical fiber 102**.

In some aspects of the present invention, at 30° C., the passive layer 112 have a viscosity in a range of 0.2 Pascal-Second (Pa·s) to 4.2 Pa·s. Particularly, if the viscosity is too less than 0.2 Pa·s then uniform application of the passive layer 112 is difficult, on the other hand viscosity above 4.2 Pa·s will make the passive layer 112 too viscous and difficult to handle.

In accordance with an embodiment of the present invention, the optical fiber 102 further has the color layer 114 concentrically surrounding and in contact with the passive layer 112. The passive layer 112 and the color layer 114 have a first strip force there between in a range of 3 Newtons (N) to 9 N. Below 3 N, the passive layer 112 not get removed and above 9 N, the passive layer 112 damage the outer coating **108*ab* of the optical fiber 102**.

In accordance with an embodiment of the present invention, the passive layer 112 and the outer coating **108*ab* of the optical fiber 102 have a second trip force therebetween in a range of 1 N to 5 N. In other words, the second strip force between the passive layer 112 and the color layer 114 is selected to be in the range of 1 N to 5 N, as below 1 N, the second strip force not be enough for handling the optical fiber ribbon 100 and above 5 N, the second strip force damage the outer coating 108*ab* of the optical fiber 102 when the passive layer 112 is stripped off from the outer coating 108*ab***.

In some aspects of the present invention, the first strip force is relatively higher than the second strip force.

In some aspects of the present invention, the optical fiber 102 is manufactured by one of, a tandem manufacturing process, a separate manufacturing process. In an exemplary scenario, the passive layer 112 and the color layer 114 is applied by way of the tandem process layer 114 in a single process and/or the passive layer 112, the color layer 114, and optical fiber ribbon 100 is manufactured in a single process.

Thus, the optical fiber ribbon 100 of the present invention provides the passive layer 112 added in between the outer coating 108*ab* and the color layer 114. The plurality of resin joints 116 is applied over the color layer 114. When the optical fiber 102 is stripped from the optical fiber ribbon 100, the damage is restricted to the passive layer 112 and layer beneath (i.e., the inner coating 108*aa* and the outer coating 108*ab*) remain intact. Further, the optical fiber ribbon 100 provides the plurality of resin joints 116 having bonds with high strength that prevent the outer coating 108*ab* from damage. The optical fiber ribbon 100 is a cost-effective optical fiber ribbon as the manufacturing of the optical fiber ribbon 100 would be approximately similar to standard optical fiber ribbon 100 due to reduced color layer 114 thickness.

Advantageously, the present invention provides an optical fiber ribbon 100 of the present invention is easy to implement as the passive layer 112 can be applied using the same process that is used to apply the color layer 114 and does not require any sophisticated equipment. Further, while stripping a fiber (e.g., the optical fiber 102) from the optical fiber ribbon 100, damage to the inner coating 108*aa* and the outer coating 108*ab* of the optical fiber 102 is prevented. This further reduces scrap generation and makes handling easy.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance suggest or render expedient, but such are intended to cover the application or implementation without departing from the spirit or scope of the claims of the present technology.

In a case that no conflict occurs, the embodiments in the present invention and the features in the embodiments be mutually combined. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed for:

1. An optical fiber ribbon (100) comprising:
- a plurality of optical fibers (102) arranged substantially parallel to one another;
- wherein each optical fiber of the plurality of optical fibers (102) comprising:
  - one or more coatings (108);
  - a passive layer (112) surrounding the one or more coatings (108);
- wherein the passive layer (112) is in continuous contact with the one or more coatings (108); and
- a color layer (114) surrounding the passive layer (112);
- wherein the color layer (114) is in continuous contact with the passive layer (112); and
- a plurality of resin joints (116) applied for intermittently contacting the color layer (114) of each pair of adjacent optical fibers of the plurality of optical fibers (102) to form bonded portions of the optical fiber ribbon (100)
- wherein the passive layer (112) and the coating (108) in contact have a strip force therebetween in a range of 1 N to 5 N; and
- wherein the one or more coatings (108) comprises a combination of an inner coating (108*aa*) and a second outer coating (108*ab*), wherein the passive layer (112) and the second outer coating (108*ab*) have a second strip force therebetween in a range of 1 N to 5 N.

2. The optical fiber ribbon (100) as claimed in claim 1, wherein each optical fiber of the plurality of optical fibers (102) further comprising a core (104), a cladding (106), the one or more coatings (108) that surrounds the cladding (106).

3. The optical fiber ribbon (100) as claimed in claim 1, wherein the one or more coatings (108) comprises one of, (i) a combination of an inner coating (108*aa*) and an outer coating (108*ab*) and (ii) the outer coating (108*ab*).

4. The optical fiber ribbon (100) as claimed in claim 1, wherein the passive layer (112) is made up of an Ultraviolet (UV) curable acrylate polymer.

5. The optical fiber ribbon (100) as claimed in claim 1, wherein the passive layer (112) is cured at least 85%.

6. The optical fiber ribbon (100) as claimed in claim 1, wherein a thickness of the passive layer (112) is in a range of 4 micrometers (μm) to 12 μm.

7. The optical fiber ribbon (100) as claimed in claim 1, wherein the passive layer (112) and the color layer (114) is applied in a tandem process.

8. The optical fiber ribbon (100) as claimed in claim 1, wherein the passive layer (112) has an elongation at break of at least 20%.

9. The optical fiber ribbon (100) as claimed in claim 1, wherein the passive layer (112) and the color layer (114) has a first strip force therebetween in a range of 3 Newton (N) to 9N.

10. The optical fiber ribbon (100) as claimed in claim 1, wherein the passive layer (112) has a tensile strength in a range of 2 Megapascal to 40 MPa.

11. The optical fiber ribbon (100) as claimed in claim 1, wherein the passive layer (112) has a viscosity in a range of 0.2 Pascal-Second (Pa·s) to 4.2 Pa·s at 30 degree Celsius (° C.).

12. The optical fiber ribbon (100) as claimed in claim 1, wherein a first and second resin joints are applied intermittently contacting a first layer (114*a*) of the first (102*a*) optical fibers and a second color layer (114*b*) of the second optical fibers (102*b*).

13. The optical fiber ribbon (100) as claimed in claim 1, wherein the plurality of resin joints are made up of a curable resin material selected from Ultraviolet (UV) curable resin material, a polyester resin, a phenolic resin, an alkyd resin, a polycarbonate resin, a polyamide resin, a silicone resin, an epoxy resin, an acrylate polymer.

* * * * *